United States Patent [19]

Howell, Jr. et al.

[11] 4,282,890

[45] Aug. 11, 1981

[54] OPEN CELL STRUCTURE FOAMED CELLULOSE ACETATE FILTERS

[75] Inventors: Carl J. Howell, Jr., Charlotte, N.C.; David W. Trott, Fort Mill, S.C.; Jesse L. Riley, Charlotte, N.C.

[73] Assignee: Celanese Corporation, New York, N.Y.

[21] Appl. No.: 41,577

[22] Filed: May 23, 1979

Related U.S. Application Data

[62] Division of Ser. No. 886,201, Mar. 13, 1978, Pat. No. 4,180,536.

[51] Int. Cl.³ .............................................. A24D 3/04
[52] U.S. Cl. ................................................... 131/332
[58] Field of Search ............... 131/10 R, 10.3, 10.5, 131/10.7, 10.9, 267, 268, 269, 264, 265, 266; 264/53, 51, 177 R, DIG. 13, 211

[56] References Cited

U.S. PATENT DOCUMENTS

| | | | |
|---|---|---|---|
| 2,085,293 | 6/1937 | Buffington | 131/53 |
| 2,242,372 | 5/1941 | Schneider | 18/48 |
| 2,372,695 | 4/1945 | Taylor | 18/48 |
| 2,512,463 | 6/1950 | Maier | 106/122 |
| 3,121,911 | 2/1964 | Lightner | 18/2 |
| 3,327,031 | 6/1967 | Boyer et al. | 264/53 |
| 3,358,695 | 12/1967 | Blakey et al. | 131/269 |
| 3,393,684 | 7/1968 | Touey et al. | 131/267 |
| 3,574,803 | 4/1971 | Allen et al. | 131/267 |
| 3,658,973 | 4/1972 | Aykanian | 264/53 |
| 3,661,160 | 5/1972 | Tunc | 131/268 |
| 3,836,615 | 9/1974 | Summit et al. | 264/47 |
| 3,843,757 | 10/1974 | Ehrenfreund et al. | 264/53 |
| 3,857,914 | 12/1974 | Aishima et al. | 264/45.5 |
| 3,861,404 | 10/1975 | Changani | 131/269 |
| 3,939,237 | 2/1976 | Naito et al. | 264/54 |
| 3,939,849 | 2/1976 | Baxter et al. | 131/269 |
| 4,054,550 | 10/1977 | Parker et al. | 264/45.3 |
| 4,075,265 | 2/1978 | McClung et al. | 264/53 |
| 4,146,563 | 3/1979 | Ratafia et al. | 264/51 |

FOREIGN PATENT DOCUMENTS

| | | | |
|---|---|---|---|
| 651163 | 10/1962 | Canada | 131/345 |
| 46-18254 | 5/1971 | Japan | 131/345 |
| 290989 | 8/1929 | United Kingdom | 131/345 |
| 530271 | 12/1940 | United Kingdom | 131/345 |
| 743364 | 1/1956 | United Kingdom | 131/345 |
| 1086747 | 10/1967 | United Kingdom | 131/345 |
| 1182646 | 2/1970 | United Kingdom | 131/345 |
| 1203498 | 8/1970 | United Kingdom | 131/345 |
| 1220086 | 1/1971 | United Kingdom | 131/345 |
| 1271274 | 4/1972 | United Kingdom | 131/345 |
| 1279803 | 6/1972 | United Kingdom | 131/345 |
| 1319599 | 6/1973 | United Kingdom | 131/345 |
| 1331096 | 9/1973 | United Kingdom | 131/345 |
| 1341400 | 12/1973 | United Kingdom | 131/345 |
| 1456908 | 12/1976 | United Kingdom | 131/345 |

OTHER PUBLICATIONS

Kunststoffe, vol. 52, (May, 1962) pp. 15 to 16.
"Twin-Screw Extruders", Plastics Technology, (Mar. 19, 1968) pp. 52-57.

*Primary Examiner*—V. Millin
*Attorney, Agent, or Firm*—Robert J. Blanke

[57] ABSTRACT

This invention relates to a method of manufacturing foamed cellulose acetate and the product produced thereby. More specifically, the invention relates to a melt extrusion process for producing open cell structure foamed cellulose acetate having special use as a filtering element for an aerosol such as tobacco smoke.

17 Claims, 12 Drawing Figures

OPEN CELL STRUCTURE FOAMED CELLULOSE ACETATE FILTERS

This is a division of application Ser. No. 886,201, filed Mar. 13, 1978, now U.S. Pat. No. 4,180,536.

Foamed cellulose acetate cigarette filters are known, such filters being disclosed in U.S. Pat. No. 3,574,803. The cellulose acetate foams of the patent are prepared by dissolving an inert gas under pressure into ripened cellulose acetate dope at its incipient precipitation point and precipitating the cellulose acetate while reducing the pressure on the dope to produce a solid foam and then washing the foam to purge the foam of residual acetic acid and salts. In order to obtain an acceptable product, it is essential that water soluble salts and acetic acid be washed from the solid foam and therefore all areas of the foamed structure must have maximum exposure to the washing operation. This process results in a product having a water pervious area on the periphery of the foamed rod and also results in a product having a cell structure which is devoid of fiber-like elements and has an average density of about 0.13 grams per cubic centimeter.

Polyolefin open cell structures having a peripheral skin are known, such structures being disclosed in U.S. Pat. Nos. 3,939,849 and 4,054,550. The polyolefin open cell structure is further characterized as a reticular structure wherein individual cells are bridged by fiber-like elements. Polyolefin foams when used in cigarette filter applications function by means of physical filtering alone; that is to say, mechanically trapping smoke-entrained matter. A major reason for the universal acceptance of cellulose acetate cigarette filters is the consumer acceptability of the taste imparted to the tobacco smoke stream as well as the ability to chemically sequester constituents from smoke vapor as well as mechanically trapping smoke-entrained matter, e.g. tarry substances. More specifically, filters of cellulose acetate exhibit a much higher selectivity for removing phenol and other simple phenolic compounds from cigarette smoke than do filters made from polyolefins. Moreover, the capacity of cellulose acetate filters for phenol removal is increased by the presence of ether ester or simple ester type plasticizers. Commercial cellulose acetate cigarette filters, however, are high density filters (from about 0.14 to 0.15 grams per cubic centimeter) prepared from cellulose acetate tow. The manufacture of filter rods from tow is an expensive process involving manufacture of tow, opening of the tow bundle, precision topical application of plasticizer, forming the opened tow bundle into a rod, wrapping and gluing the rod and cutting the rod into suitable lengths. In addition to the obvious complexity of the tow to cigarette filter rod process, the topical application of plasticizer can, on rod aging, produce internal migration of the plasticizer and consequent variations in the ability of the plasticizer to remove phenol from tobacco smoke.

It is therefore an object of this invention to provide low density open cell structure plasticized cellulose acetate foam rods wherein at least some of the individual cells are bridged by fiber-like elements.

It is still another object of this invention to provide a process for the preparation of a low density open cell structure plasticized cellulose acetate foam rod wherein the individual cells are bridged by fiber-like elements.

These and other objects of the invention will become more apparent from the following description of the invention.

In accordance with this invention, it has now been discovered that an improved low density open cell foamed cellulose acetate cigarette filter may be obtained by means of a process comprising melt extruding, through an extruder equipped with an eliptical or circular die, into a temperature conditioned atmosphere, a mixture of cellulose acetate, plasticizer, blowing agent and nucleating agent. The presence of a plasticizer is found to lower the glass transition temperature of cellulose acetate and make melt extrusion of a foamed cellulose acetate possible without undesirable thermal degradation of the polymer. Preferably, the extruder is a screw extruder.

The process must be conducted in a manner such that blowing agent gas cannot excape, that is to say, flow in a direction away from the direction of extrusion. If blowing agent is allowed to escape in this manner, the process becomes difficult to control and nonuniform linear and bulk densities are produced in the end product. The escape of blowing agent is prevented by means of a pressure gradient wherein the pressure upstream of the blowing agent injection port is greater than the pressure downstream of the blowing agent injection port. Preferably, the pressure gradient is achieved by means of a dam which is either generated by molten cellulose acetate filling the barrel of the extruder or by means of a mechanical damming means which forms a portion of a screw extruder. Accordingly, the process requires that blowing agent be added downstream of the dam. The extrusion process may therefore be divided into six zones, each zone being maintained within a precise temperature range. It should be understood that the zones designated as zones two, three and four are within the screw extruder.

The first zone may be classified as a polymer feed zone wherein cellulose acetate flake is maintained at a temperature of from $-20°$ C. to $100°$ C. to prevent agglomeration during the feeding the flake into an extruder.

The second zone which is within the extruder is a cellulose acetate polymer melt zone maintained at an inlet temperature of not less than $100°$ C. and an exit temperature of not more than $240°$ C.

The third zone which is within the extruder is a high pressure, high shear zone maintained at temperatures above the glass-rubber transition temperature of cellulose acetate. The third zone is provided with damming means to prevent gas from flowing away from the direction of extrusion. The third zone is also the zone in which blowing agent is added, downstream from the damming means.

The fourth zone which is within the extruder is a mixing zone maintained at a temperature less than zone three.

The fifth zone is the extrusion die zone which is maintained at temperatures in the range of $180°$ C. to $270°$ C.

The sixth zone is a conditioning zone maintained at a temperature of from about $45°$ C. to within $5°$ C. of the glass-rubber transition temperature of the extrudate whereby the escape of blowing agent is controlled and proper rod skin formation is obtained and collapse of the foam structure is reduced.

The rod, after passage through a conditioning cabinet, is passed through a rod shaping device, the rod being maintained under sufficient tension to inhibit rod sagging while pulling the rod through the rod shaping device. The tensioning is accomplished by means of a rod puller. Rod pulling devices suitable for use in conjunction with this invention are disclosed in U.S. Pat. No. 3,813,200. The rod is then cut to the desired filter rod length, the rods than being cut to the desired tip length and attached to cigarettes by gluing tipping paper around the tip and around the tobacco column of the cigarette. The tips are rigid, dimensionally stable, substantially uniformly plasticized cylinders with a substantially water impervious skin and a substantially uniform cross-sectional density. The plasticized open cell foamed cellulose acetate filter rod may be characterized as being substantially homogeneously plasticized, having a density of less than 0.12 gram per cubic centimeter, a pressure drop of from 20 to 200 mm of water and a hardness before and after smoking of at least 20 percent for a 20 mm long rod having a circumference of 24.8 mm, a reticulated cell structure wherein at least some of the individual cells contain bridging filament-like members and preferably a rod skin structure which is substantially water impervious. The substantially homogeneous distribution of plasticizer inhibits plasticizer migration which is known to result in a variation in phenol removing efficiency. The filter of the instant invention, having homogeneously distributed plasticizer, is therefore substantially constant in phenol removal.

The term "cellulose acetate" as employed herein is meant to define an ester prepared from acetylation grade wood pulp with higher than 90 percent by weight of alphacellulose wherein the degree of esterification as expressed by acetyl value is about 55.0 percent, as combined acetic acid. Fully acetylated cellulose acetate contains 44.8 percent combined acetyl or 62.5 percent as combined acetic acid. The cellulose triacetate is then hydrolyzed to give a cellulose acetate which contains approximately 39.42 percent combined acetyl or 55.0 percent + or −0.35 percent as combined acetic acid.

Preferably, the cellulose acetate flake of this invention has a standard deviation in viscosity in 6 percent solutions of less than about 8 centipoises. The viscosity of a 6 percent solution of cellulose acetate flake is measured by timing the flow through a calibrated viscometer of a solution containing about 6 weight percent cellulose acetate in a solvent preferably 95/5 weight percent acetone/water. Preferably the flake also has a standard deviation in the degree of esterification, expressed as the combined lower fatty acid, of less than about 0.20 percent, preferably less than about 0.15 percent.

The bound sulfate content of cellulose acetate should be controlled at a minimum value because of the effect of these sulfates on the thermal stability and elevated temperature viscosities. The sulfate determination is from a sample treated with hot 0.07 weight percent hydrochloric acid in a steam autoclave to split off bound sulfate groups. These, together with the soluble sulfate salts, are leached out and determined gravimetrically after precipitation with barium chloride. Results are reported as percent sulfate, $SO_4$, by weight. Preferably, the bound sulfate content of the cellulose acetate flake employed herein should be less than 0.003 percent by weight.

A better understanding of the invention may be had from the drawings wherein

Figure 1:
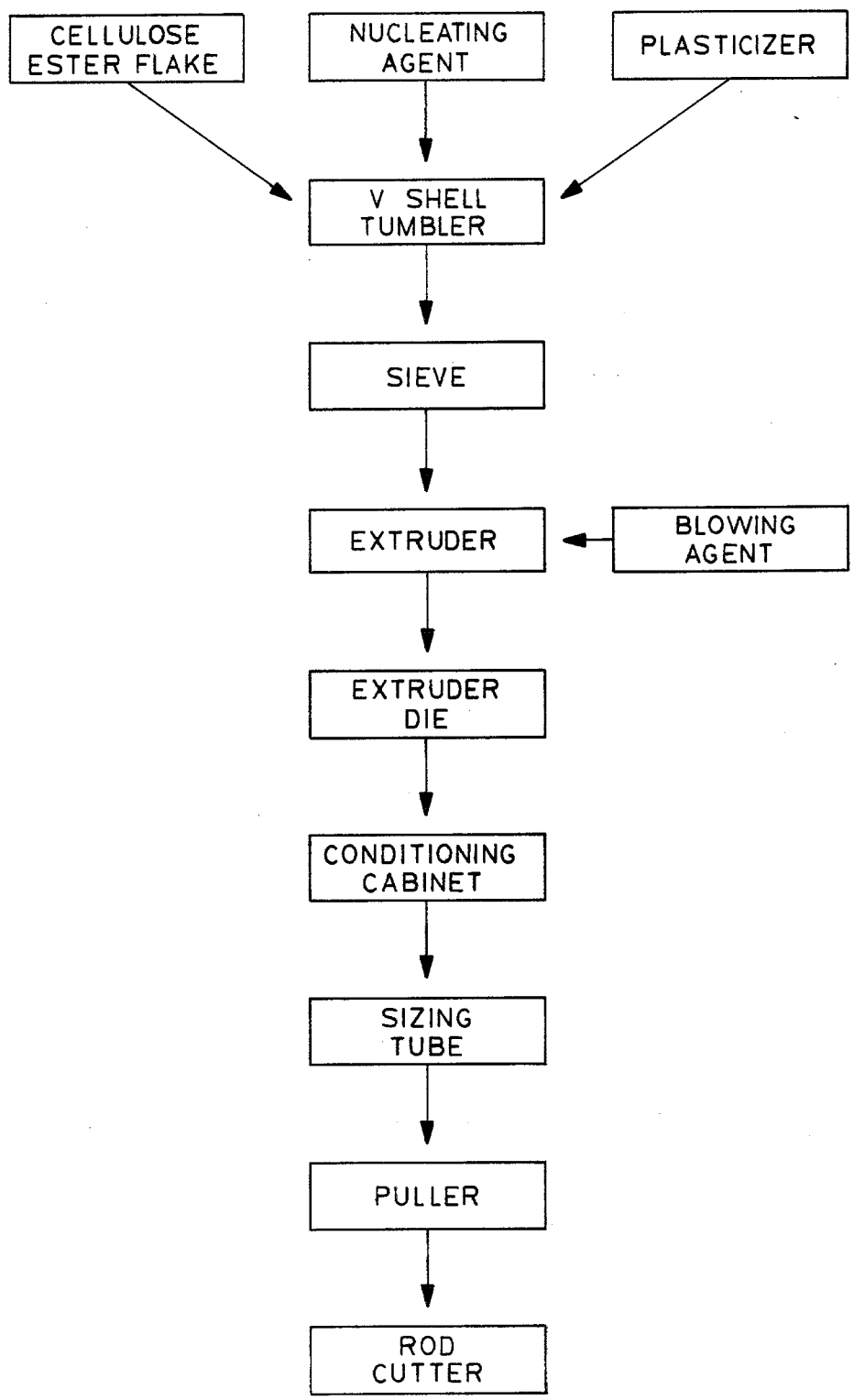
FIG. 1 is a flow diagram of the process for producing the filter element of this invention.

Turning to FIG. 1 of the drawings, cellulose acetate flake, from 10 to 26 percent by weight of a plasticizer based on the weight of the total composition and 0.5 to 15 percent by weight of a nucleating agent based on the weight of the total composition are fed into a tumbler, mixed and then dried to a moisture content of less than about 0.5 percent $H_2O$. Alternatively, the cellulose acetate flake may be dried before mixing, drying in either case being carried out to prevent moisture from causing agglomeration. The plasticizer is a nontoxic, taste compatable and thermally stable plasticizer having a boiling point of not less than 180° C. selected from the group consisting of esters of saturated dibasic acids, esters of saturated polyhydric alcohols, fatty acid esters and sulfonamide resins and more specifically a plasticizer selected from the group consisting of diethyl adipate, dicapryl adipate, dimethoxyethyl adipate, diethoxyethyl, dimethoxyethoxy adipate, triethyl citrate, tris-n-butyl citrate, acetyl triethyl citrate, glycerol monoacetate, glycerol diacetate, glycerol triacetate, (ethoxycarbonyl) methyl methyl phthalate, bis(2 methoxyethyl) phthalate, diethylene glycol diacetate, triethylene glycol diacetate, glycerol triisopropionate, ethylene glycol dipropionate, diethylene glycol dipropionate, dimethyl sebacate, diethyl succinate, dibutyl tartrate, isophthalic propylene glycol polyester and polyalkylene glycols. The most preferred plasticizer is a plasticizer selected from the group consisting of glycerol triacetate, triethylene glycol diacetate and mixtures thereof. Glycerol triacetate and triethylene glycol diacetate may also be employed as plasticizers together with various amounts of polyethylene glycol.

Suitable nucleating agents preferably are inorganic materials of high surface area, preferably 0.28 square meters per gram or greater and which produce more cells in the foam than would be produced in their absence.

The nucleating agent is preferably a nucleating agent selected from the group consisting of molecular sieve materials, titanium dioxide, perlite, diatomaceous earth, limestone and talc. It should be understood, however, that other nontoxic thermally stable uniform particle size inorganic uncleating agents may be employed as long as these nucleating agents do not impart undesirable color to the extrudate. After tumbling and drying, the mixture is removed from the tumbler and preferably sieved so as to remove oversized particles and obtain a satisfactory molding powder.

The molding powder is then fed at a constant rate to an extruder which preferably has the following characteristics: good forwarding with narrow residence time distribution, i.e., minimum back mixing; multiple zone temperature control with good heat transfer temperature control for heating and cooling; good mixing of components, particularly the blowing agent with minimal heat buildup; minimal post screw residence time and minimal post screw laminar flow to prevent wall layer degradation. Preferably the screw revolutions per minute are controlled to provide minimum residence time with minimum shear degradation. Preferably the extruder is also divided into a plurality of temperature control zones, the first zone being the hopper wherein temperatures are controlled in the range of from 20 degrees to 100 degrees centigrade to prevent agglomeration of cellulose acetate flake. The second temperature control zone is the melting zone wherein temperatures are maintained within the range of from 100° to 240° C., and preferably 150° to 200° C. In this second zone, a vent port should be employed so as to allow water and entrained air to escape to the atmosphere. In the third zone, the temperature of the material in the extruder is kept above the glass-rubber transition temperature. The blowing agent in quantities of from 2 percent to 7 percent by weight based on the weight of the total composition is injected into the third zone while temperatures are controlled within the range of from 200° to 700° C. and preferably 240° to 250° C. The cellulose acetate melt containing a blowing agent then passes through a fourth zone which is a mixing zone, maintained at a temperature less than zone three. The blowing agent which is injected into the third zone is at least a partial solvent for cellulose acetate and is selected from the group consisting of ketones, esters and monohydric alcohols having boiling points no higher than 120° C. Preferably the blowing agent is selected from the group consisting of acetone, methyl acetate, ethyl acetate, methanol, ethanol, propanol and water.

Figure 2:
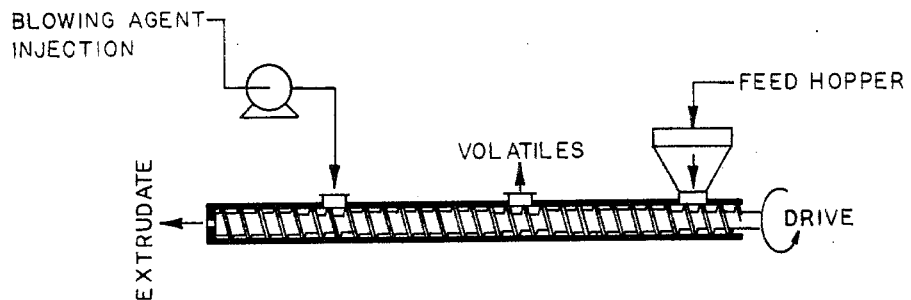
FIG. 2 is a schematic view of one type of screw extruder suitable for use in this invention.
Figure 3:
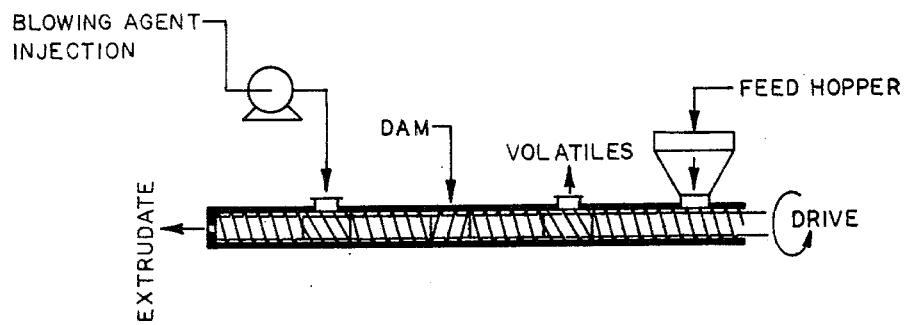
FIG. 3 is a schematic view of another type of screw extruder suitable for use in this invention.
Figure 4:
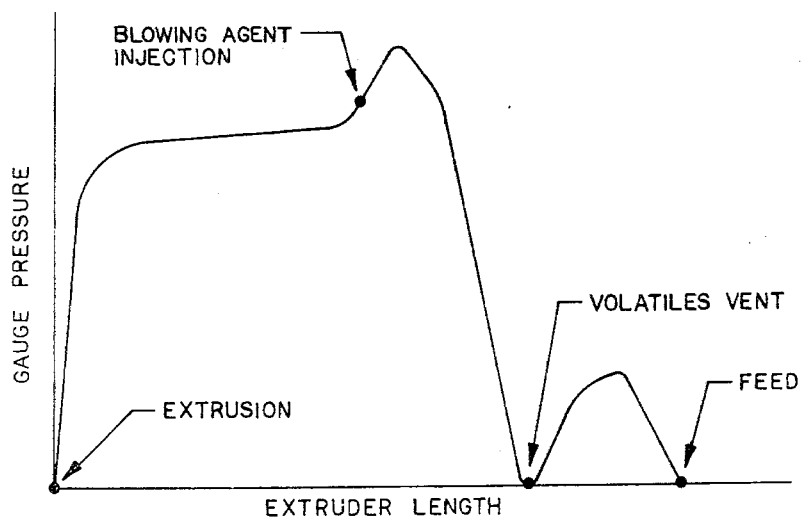
FIG. 4 is a graph plotting pressure against screw length of a twin screw extruder suitable for use in this invention.

A better understanding of the function of the screw extruder may be had from a discussion of FIGS. 2, 3 and 4 of the drawings.

FIG. 2 is a schematic illustration of a single screw extruder arrangement suitable for use in conjunction with this invention. In any screw-type extrusion operation, a solid is rendered workable by frictional energy and external thermal energy, transported through the apparatus and subjected to shear, while maintaining the correct stock temperature. In the process of the instant invention, it is also necessary to withdraw volatiles, add a blowing agent and generate enough pressure to force the melt through an eliptical or circular die.

As can be seen in FIG. 2 of the drawings, the schematically illustrated single screw extruder, which is not to scale, has varying screw depths, the increased screw depths which are apparent in the region of the feed hopper, the volatiles vent port and the blowing agent injection port reduces the total volume of the screw at those particular points and correspondingly relieves pressure at that point. It should be understood that volume reduction and corresponding pressure reduction can also be achieved by varying screw pitch rather than screw depth. It should also be noted in FIG. 2 of the drawings that any entrained moisture or volatile matter present in the mixture fed from the feed hopper into the screw extruder is substantially reduced at the volatiles vent port.

It is essential in the single screw extruder employed in this invention that the pressure profile along the length of the single screw be such as to prevent any blowing agent from backing up and exiting through the volatiles vent port. It is preferred for purposes of this invention that a twin screw extruder be employed for better heat transfer, shear mixing and pressure profile control and better control of residence time distribution.

A schematic illustration of a twin screw extruder arrangement suitable for use in conjunction with this invention may be seen in FIG. 3 of the drawings. While for ease of illustration a single screw has been shown in FIG. 3 of the drawings, it should be understood that for purposes of this invention, a co-rotating intermeshing twin screw extruder is to be preferred.

Twin screw extrusion devices have been found to be preferrable to single screw extrusion devices in that the twin screw devices minimize any tendency of the melt to surge or pulsate through the extruder due to better stabilization of the pressure profile along the length of the twin screw extruders. Moreover, the intermeshing twin screw construction has a self-wiping action which prevents any portion of the polymer charge from experiencing an unduly long residence time in the extruder, prolonged residence time of course resulting in polymer degradation. As can be seen in FIG. 3 of the drawings, each identical screw member of the twin screw device contains sections of varying screw pitch, the screw pitch being maximized in the area of the volatiles vent port and the blowing agent injection port so as to reduce pressures in the zones. The identical screw members of the twin screw extruder of FIG. 3 also have a damming means between the volatiles exit port and the blowing agent injection port, the damming means comprising a screw section of opposite hand. The damming means formed by reversing the hand of the screw pitch prevents the blowing agent which is injected into the blowing agent injection port from passing upstream and escaping through the volatiles vent port.

As previously noted, the apparatus of the instant invention may be divided into six distinct temperature zones, the first of which is a temperature control zone at the feed hopper and the sixth of which is a temperature control for the rod conditioning cabinet. The barrel of the extruder is divided into temperature control zones two, three and four while the extrusion die constitutes the fifth temperature control zone. Additionally, the barrel of the extruder may be divided into a plurality of pressure control zones, as can be seen in FIG. 4 of drawings which is an idealized plot of pressure against barrel length. The highest pressures are experienced between the volatiles vent port and the dam member, relatively lower pressures being present between the blowing agent injection port and the extrusion orifice. While the specific diagram of FIG. 4 has been plotted for the extrusion apparatus of FIG. 3, it should be understood that a similar pressure profile is also obtained in a single screw extruder as illustrated by FIG. 2 of the drawings, however, as previously noted, the pressure profile of a single screw extruder is much more difficult to control and therefore the twin screw extruder is preferred for purposes of this invention.

The material from the extruder is passed to an extruder die. The die temperature, which constitutes a fifth temperature control zone, is extremely critical and must be controlled to within plus or minus 1° C. of a preselected temperature of from 180° to 270° C. to achieve target rod diameter and desired filter properties. The melt extrusion stage is followed by transfer of the material to a sixth temperature control zone which constitutes a conditioning cabinet which has inlet and outlet openings to permit the rod to pass through and means for controlling the temperature in the cabinet. The cabinet controls skin temperature and porosity to allow escape of the blowing agent. Temperatures of about 45° to within 5° C. of the glass-rubber transition temperature of the extrudate are maintained.

If the rod is extruded into a cool atmosphere, it will cool too rapidly and collapse. Once the blowing agent has evaporated, the cooled rod has lost its elasticity. A minimum residence time of about one second in the conditioning cabinet is required to prevent some rod diameter loss.

After emerging from the conditioning stage, the rod passes through a heated sizing device for final trimming of the rod diameter and smoothing the rod skin. A rod puller maintains sufficient tension on the rod to prevent sagging of the rod as it passes through the sizing tube. A cutter on the discharge side of the rod puller cuts the rod to a convenient length for handling.

The following specific examples are given for purposes of illustration and should not be considered as limiting the spirit or scope of this invention.

EXAMPLE I

Cellulose acetate flake is ground in a mill to a particle size of less than 3 mm.

A molding powder composition is then prepared by intimately mixing 78.9 weight percent undried cellulose acetate flake (5% $H_2O$), 16.9 weight percent of glycerol triacetate plasticizer and 4.2 weight percent perlite nucleating agent. This compound is then dried for 14 hours at 65° C. to reduce the moisture level to less than 0.5 weight percent. The dried compound is allowed to cool to room temperature and is precision fed to a twin screw extruder through a cooled feed throat (zone 1). The material is melted (zone 2) and vented to remove entrained air and any remaining water vapor. The melt is then additionally heated and 3.75 weight percent of acetone blowing agent added based on the weight of the total composition (zone 3). The mixture is then cooled to 229° C. (zone 4) before exiting the screw and entering the extrusion block from which it has extruded at a die temperature of 240° C. (zone 5) through a 3 mm circular orifice into a one meter long hot air chamber maintained at a temperature of 73° C. (zone 6). The solidified rod is then pulled through a shaping and sizing device to ensure roundness and proper size by foam sheathed rollers at 17.7 meters/min, and cut into 120 mm long sections.

The product produced is found to be a round rod of 7.73 mm diameter. Both the rod skin and end appearance are found to be of uniform white color, with a small and uniform open cell structure. Density is 0.109 gm/cc. The rods are then cut into 20 mm long tips and tested by methods well-known to those familiar in the practice of cigarette filtration. Encapsulated pressure drop is measured at 58 mm $H_2O$ with a smoke removal efficiency of 33.4 percent of total particulate matter. Tip weight is 0.102 gm/20 mm tip with a firmness before and after smoking of 96 percent as measured by a "FILTRONA" firmness tester.

EXAMPLE II

The process of Example I is repeated except that the triacetin plasticizer level and extruder temperature conditions were varied as follows:

| Screw Extruder Conditions | | | | | Triacetin | Triacetin |
|---|---|---|---|---|---|---|
| Zone 2 | Zone 3 | Zone 4 | Die Zone | Torque | in Feed (wt%) | in Final Rod |
| 180° C. | 313° C. | 290° C. | 292° C. | 110+% | 0% | 0 % |
| 152° C. | 271° C. | 237° C. | 246° C. | 80–90% | 14.7% | 10 % |
| 152° C. | 260° C. | 230° C. | 235° C. | 74% | 18% | 15 % |
| 128° C. | 215° C. | 194° C. | 210° C. | 80% | 23% | 21.5 % |

The rod extrudates obtained with 14.7% and 18% triacetin are found to be satisfactory in all respects. The rod extrudate obtained with 0% triacetin is found to be heavily degraded with no size control or reasonable cell structure and commercially unacceptable. The rod extrudate obtained with 23% triacetin is found to be overplasticized, that is to say, the cell structure is large and open and commercially unacceptable.

EXAMPLE III

A V-shell tumbler is charged with 69.84 weight percent of cellulose acetate and 3.23 weight percent of limestone nucleating agent and mixed for ten minutes at which time 6.79 weight percent of methyl alcohol is added at a rate of 8 milliliters per minute followed by the addition of 3.23 weight percent of acetone and 15.73 weight percent of triacetin. Mixing is continued for another thirty minutes and the mixture is screened through a 3½ sieve to eliminate agglomerates. The mixture is then charged into a CS Brabender Model 250 extruder having a ¾" screw and a 25 to 1 length to diameter ratio. The mixture is melted in the unvented extruder and extruded through a 0.18" diameter orifice. After extrusion the rod is conditioned in a heating cabinet sized by means of a die and then cut. The operating conditions of the equipment are as follows:

| Extruder Zone Temperatures (°C.) | | | | Screw | Orifice | Barrel Press | Heated Cabinet |
|---|---|---|---|---|---|---|---|
| 2 | 3 | 4 | Die(zone 5) | rpm | Dia. | Psig | Profile (°C.) |
| 130 | 139 | 215 | 220 | 130 | 0.18" | 200 | 105,110,120,100 |

The rod end product is found to be an open cell foam structure, however, the pore size is not as uniform and consequently, the product is not as desirable as that produced by the vented screw extruder of Example 1.

Pressure drop as reported in the preceding examples is measured by the following method: Air is sucked through a 20 millimeter length of the fully encapsulated filter at a steady rate of 1050 cubic centimeters per minute and the resulting pressure difference across the filter is measured by means of a water manometer. The result is expressed in millimeters of water gauge.

Cigarette filter rod hardness as reported in the preceeding examples is measured by means of a "FILTRONA" Tester (manufactured by Cigarette Components Limited), by a test in which a rod (for example a length of say 120 millimeters of the foamed resin) having a mean diameter (D), for example about 7.8 millimeters, is compressed between two plates provided in the instrument. The rod is subjected to compression for 15 seconds by a load of 300 grams applied to opposite sides of the cylindrical surface of the rod and the average depression (A), that is the decrease in diameter of the rod, is measured. The hardness is the diameter of the sample measured at a load of 300 grams and expressed as a percentage of the original diameter, that is, it is given by the following formula:

$$\text{Hardness \%} = [(D-A)]/D \times 100$$

Smoke removal efficiency as reported in the preceding examples is determined as follows:

Twenty weighed tips are attached to standard tobacco columns and smoked on a Keith-Newsome Smoking Machine as set forth in Tobacco Science 1:51-54(1957). Traps are used to collect the particulate matter which passes through the cigarette filter. Smoke removal efficiency is calculated by dividing the increase in weight of the tips by the sum of the weight increases of the tips and the Cambridge traps.

Figure 5:
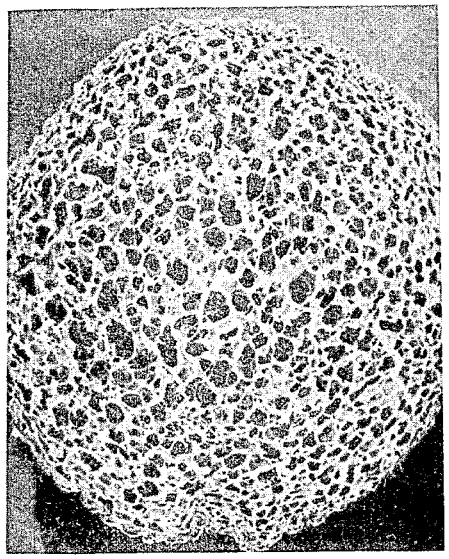
FIG. 5 is a projected view photomicrograph magnified 11 times of the filter element prepared according to Example 1 of this invention.
Figure 8:
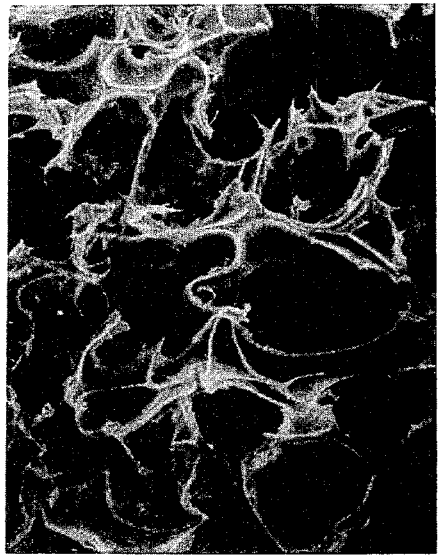
FIG. 8 is a cross-sectional photomicrograph magnified 100 times of the cellulose acetate filter rod prepared according to Example 1 of this invention.

The product of this invention is best illustrated in the projected view of FIG. 5 of the drawings and in cross-section by FIG. 8 of the drawings. The product, as can be seen, is cylindrical with a well-formed skin which is found to be substantially water impervious. Within the skin is an interconnecting expanded cellular foam, at least some of the cells being further characterized by the presence of fibrils bridging the cell walls, the entire structure having a high ratio of membranous cell walls to fibrils. Although smoke gasses in cigarette smoke moves through the foam with relative ease, a significant amount of particulate matter and condensable vapor is trapped in the foam by impingement and absorption. The filter provides a large available surface for the capture of smoke particles due to the small cell size and the presence of fibrils within at least some of the cells. Therefore, the smoke is relatively uniformly distributed throughout the filter cross-section.

Figure 6:
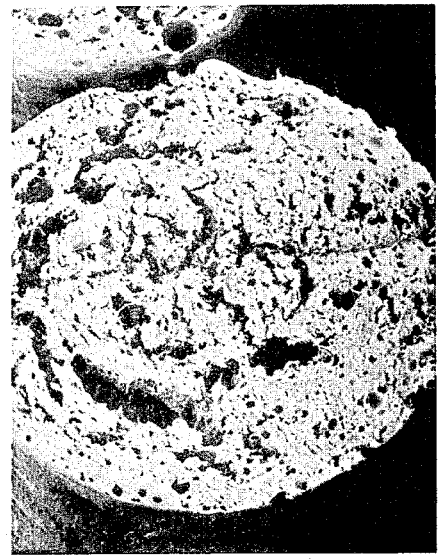
FIG. 6 is a projected view photomicrograph magnified 10 times of a prior art cellulose acetate filter element.
Figure 7:
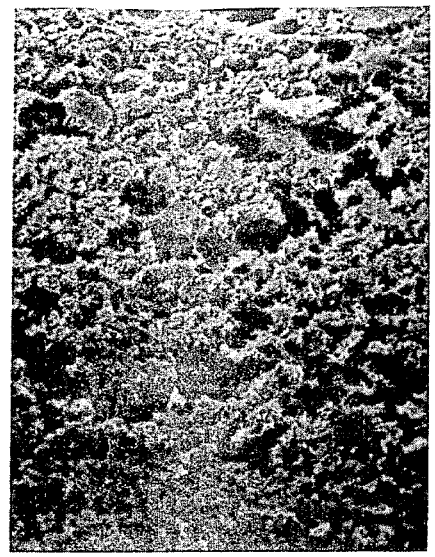
FIG. 7 is a cross-sectional photomicrograph magnified 100 times of a prior art cellulose acetate filter rod.

FIG. 6 of the drawings is representative of a projected view of the filter tip of the precipitated cellulose acetate filter of U.S. Pat. No. 3,574,803. Rather than being an expanded foam, this filter is best characterized as illustrated in cross-section by FIG. 7 of the drawings, as a sintered structure containing voids. There is no evidence of membranes or microfibrils normally associated with hot melt extruded foamed structures.

Figure 9:
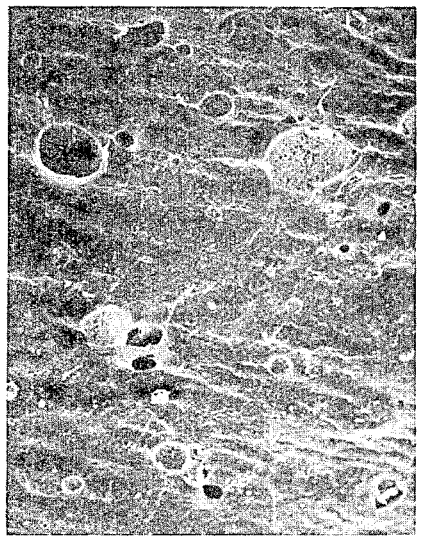
FIG. 9 is a photomicrograph magnified 100 times of the skin of a prior art cellulose acetate filter rod.
Figure 10:
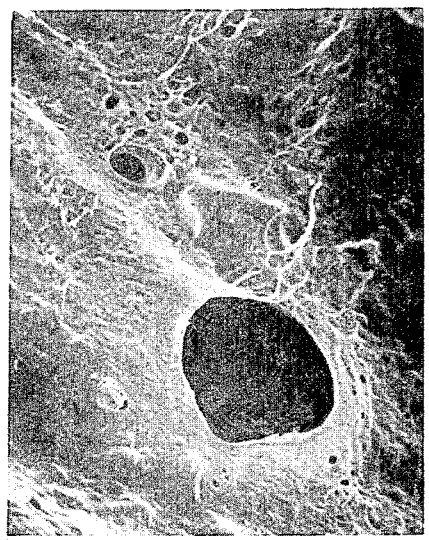
FIG. 10 is a photomicrograph magnified 1000 times of the skin of a prior art cellulose acetate filter rod.
Figure 11:
FIG. 11 is a photomicrograph magnified 100 times of the skin of the cellulose acetate filter rod prepared according to Example 1 of this invention.
Figure 12:
FIG. 12 is a photomicrograph magnified 1000 times of the skin of the cellulose acetate filter rod prepared according to Example 1 of this invention.

Distinctions between the skin structure of the precipitated cellulose acetate filter rod of U.S. Pat. No. 3,574,803 as represented by FIGS. 9 and 10 of the drawings are readily apparent over the skin structure of the cellulose acetate filter rod of this invention as represented by FIGS. 11 and 12 of the drawings. FIGS. 9 and 10 which are magnified 100 and 1000 times respectively reveal large surface voids which render the rod water permeable. FIGS. 11 and 12 which are also magnified 100 and 1000 times respectively are free of surface voids and hence water impermeable.

Having thus disclosed the invention, what is claimed is:

1. A cigarette filter rod comprising a substantially homogenously plasticized cellulose acetate, substantially open cell foam characterized by the presence of at least some cells which are bridged by fibrels, said cellulose acetate having a degree of esterification as expressed by acetyl value of about 55 percent, as combined acetic acid, and a bound sulfate content of less than 0.003 percent by weight.

2. The filter rod of claim 1 having a density of less than 0.12 gram per cubic centimeter.

3. The filter rod of claim 1 having a substantially water impervious skin structure.

4. The filter rod of claim 1 having a hardness as measured by a "FILTRONA" tester of greater than 85 percent before smoking.

5. The filter rod of claim 1 having a pressure drop of from 20 to 200 millimeters of water for a rod having a length of 20 millimeters and a circumference of 24.8 millimeters.

6. The filter rod of claim 1 having a smoke removal efficiency greater than 20 percent.

7. The filter rod of claim 1 containing a nucleating agent.

8. The filter rod of claim 7 wherein said nucleating agent is a nucleating agent selected from the group consisting of molecular sieve materials, titanium dioxide, perlite, diatomaceous earth, limestone and talc.

9. A cigarette filter rod comprising a substantially homogenously plasticized cellulose acetate, substantially open cell foam characterized by the presence of at least some cells which are bridged by fibrils, said homogenously plasticized cellulose acetate employing a plasticizer selected from the group consisting of esters of saturated dibasic acids, esters of saturated polyhydric alcohols, fatty acid esters and sulfonamide resins.

10. The filter rod of claim 8 wherein said plasticized cellulose acetate is plasticized with a plasticizer selected from the group consisting of glycerol triacetate, triethylene glycol diacetate and mixtures thereof.

11. The filter rod of claim 8 wherein said plasticized cellulose acetate is plasticized with from 10 to 15 percent by weight of triacetin.

12. The filter rod of claim 8 having a density of less than 0.12 gram per cubic centimeter.

13. The filter rod of claim 8 having a substantially water impervious skin structure.

14. The filter rod of claim 8 having a hardness as measured by a "FILTRONA" tester of greater than 85 percent before smoking.

15. The filter rod of claim 8 having a pressure drop of from 20 to 200 millimeters of water for a rod having a length of 20 millimeters and circumference of 24.8 millimeters.

16. The filter rod of claim 8 having a smoke removal efficiency greater than 20 percent.

17. The filter rod of claim 9 containing a nucleating agent selected from the group consisting of molecular sieve materials, titanium dioxide, perlite, diatomaceous earth, limestone and talc.

* * * * *